United States Patent [19]
Bosgeiter et al.

[11] Patent Number: 5,931,491
[45] Date of Patent: Aug. 3, 1999

[54] AIRBAG MODULE WITH A REDUCED NUMBER OF FASTENERS

[75] Inventors: Lance M. Bosgeiter, Roy; Quin Soderquist, South Weber, both of Utah

[73] Assignee: Autoliv ASP, Inc., Ogden, Utah

[21] Appl. No.: 08/919,878

[22] Filed: Aug. 28, 1997

[51] Int. Cl.$^6$ ................................................. B60R 21/16
[52] U.S. Cl. .................. 280/728.2; 280/731; 280/743.1
[58] Field of Search ................................ 280/728.2, 731, 280/732, 743.1

[56] References Cited

U.S. PATENT DOCUMENTS

| | | | |
|---|---|---|---|
| Re. 33,938 | 5/1992 | Cuevas | 280/731 |
| 2,755,125 | 7/1956 | Hodges | 296/84 |
| 2,850,291 | 9/1958 | Ziccardi . | |
| 3,656,790 | 4/1972 | Truesdell | 293/1 |
| 3,853,334 | 12/1974 | Auman et al. | 280/150 AB |
| 4,111,457 | 9/1978 | Kob et al. | 280/728 |
| 4,278,638 | 7/1981 | Nilsson et al. | 422/166 |
| 4,913,461 | 4/1990 | Cuevas | 280/731 |
| 4,960,292 | 10/1990 | Sadler | 280/731 |
| 4,986,569 | 1/1991 | Bruton | 280/743 |
| 5,074,585 | 12/1991 | Satoh | 280/743 |
| 5,290,059 | 3/1994 | Smith et al. | 280/728 A |
| 5,338,060 | 8/1994 | Soderquist | 280/728 B |
| 5,388,858 | 2/1995 | Cuevas | 280/728 A |
| 5,425,548 | 6/1995 | Rasmussen | 280/728.2 |
| 5,449,197 | 9/1995 | Kerner | 280/731 |
| 5,505,489 | 4/1996 | Bollaert et al. | 280/743.1 |
| 5,520,409 | 5/1996 | Saderholm | 280/728.2 |
| 5,560,643 | 10/1996 | Lang et al. | 280/728.2 |
| 5,577,763 | 11/1996 | Cuevas | 280/728.2 |
| 5,634,658 | 6/1997 | Adams | 280/728.2 |
| 5,806,883 | 9/1998 | Cuevas | 280/731 |
| 5,826,913 | 10/1998 | Mramor | 280/728.2 |

FOREIGN PATENT DOCUMENTS 1160757  6/1989  Japan .

*Primary Examiner*—Kenneth R. Rice
*Attorney, Agent, or Firm*—Sally J. Brown

[57] ABSTRACT

An airbag module featuring a reduced number of components is disclosed. The assembly of the module is simplified by the fewer number of components involved and by the use of a single fastener to hold the major components together as a module. The module comprises an inflator, an inflatable cushion, an optional cover and an optional insulator, all of which are held together by a single clamp.

17 Claims, 5 Drawing Sheets

AIRBAG MODULE WITH A REDUCED NUMBER OF FASTENERS

BACKGROUND OF THE INVENTION

1. Field of the Invention

The present invention involves an inflatable passive restraint system for restraining the occupants of a moving compartment, such as an automobile, in the event of a collision or other sudden and severe deceleration. Such systems, generally referred to as airbag systems, have become increasingly popular in modern motor vehicles.

This invention provides an improved airbag system which contains fewer component parts, including fewer fasteners, and generally requires fewer manipulations, is easier and less expensive to assemble than similar prior art airbag systems.

2. Description of Related Art

Airbag systems usually comprise a module containing four major components, an inflatable airbag cushion, an inflator to provide the inflation gas for the cushion, a cover deployed over the cushion and adapted to open when the inflator is activated, and a connecting structure such as a reaction canister, housing or mounting plate to hold and orient the components. Such systems are provided in different configurations dependent upon where they are to be mounted and the space available in the particular model vehicle for which they are intended. Airbag systems intended to protect an automobile driver are typically mounted on the steering column directly in front of the driver, while those intended to protect front seat passengers are usually mounted behind the instrument panel, or dashboard.

Prior art airbag modules have typically been assembled by attaching each of the cushion, the inflator and the cover to the housing, canister or mounting plate by a plurality of bolts, rivets or other fasteners. A number of such fasteners are required to distribute the inflation forces about the cushion mounting so that the cushion does not leak and is not torn due to a concentration of inflation forces at too few mounting locations. The multiple joining operations, each requiring orientation of the components to be joined and the application of multiple fasteners, results in a relatively complex and expensive assembly procedure. Moreover, these operations are a major cause of manufacturing defects which require that the assemblies be either reworked or discarded.

A number of systems have been developed to facilitate the assembly process. For instance, U.S. Pat. No. 5,388,858 discloses a module which additionally includes a retainer member to hold the components in position once it is attached by deforming a portion of the housing. U.S. Pat. No. 5,634,658 discloses a simplified method of assembling the module which mounts the airbag cushion by compressing it between the module housing and the inflator. U.S. Pat. No. 5,520,409 discloses a method of attaching the cover to the housing by using a band of heat shrinkable material, while U.S. Pat. Nos. 2,755,125; 3,853,334 and 4,111,457 describe the use of a clamp and, in the last patent, an elastic strip, to attach the cushion to the housing. U.S. Pat. No. 2,850,291 describes the use of a ring to attache the cushion to a ring nut which is attached to a casing containing liquid carbon dioxide. U.S. Pat. No. 5,560,643 discloses attaching the cushion around the inflator by providing a stiffening collar ring in the cushion adjacent to its opening and then clamping the cushion about the periphery of the inflator by deforming a clamping structure partially about the portion of the cushion containing the stiffening collar ring.

Notwithstanding these developments, the need to provide reliable airbag assemblies containing fewer components and requiring fewer operations during the assembly process continues.

SUMMARY OF THE INVENTION

The present invention provides an airbag module of relatively few components which is relatively easy to assemble. In particular, the number of fasteners required to assemble the module is greatly reduced. Moreover, the inventive module does not require a connecting structure such as a reaction canister or a housing to hold and orient the cushion, inflator and cover.

The inventive airbag module comprises an inflator having a clamping surface over which the collar of the airbag cushion extends and is sealed by a clamp comprising a tensioned band extending around the collar and compressing it into the clamping surface. Preferred forms of the module include an openable cover extending over the folded, stored airbag to a throat section which extends over the collar of the cushion whereby it also is compressed by the tensioned band of the clamp.

DETAILED DESCRIPTION OF THE INVENTION

Figure 1:
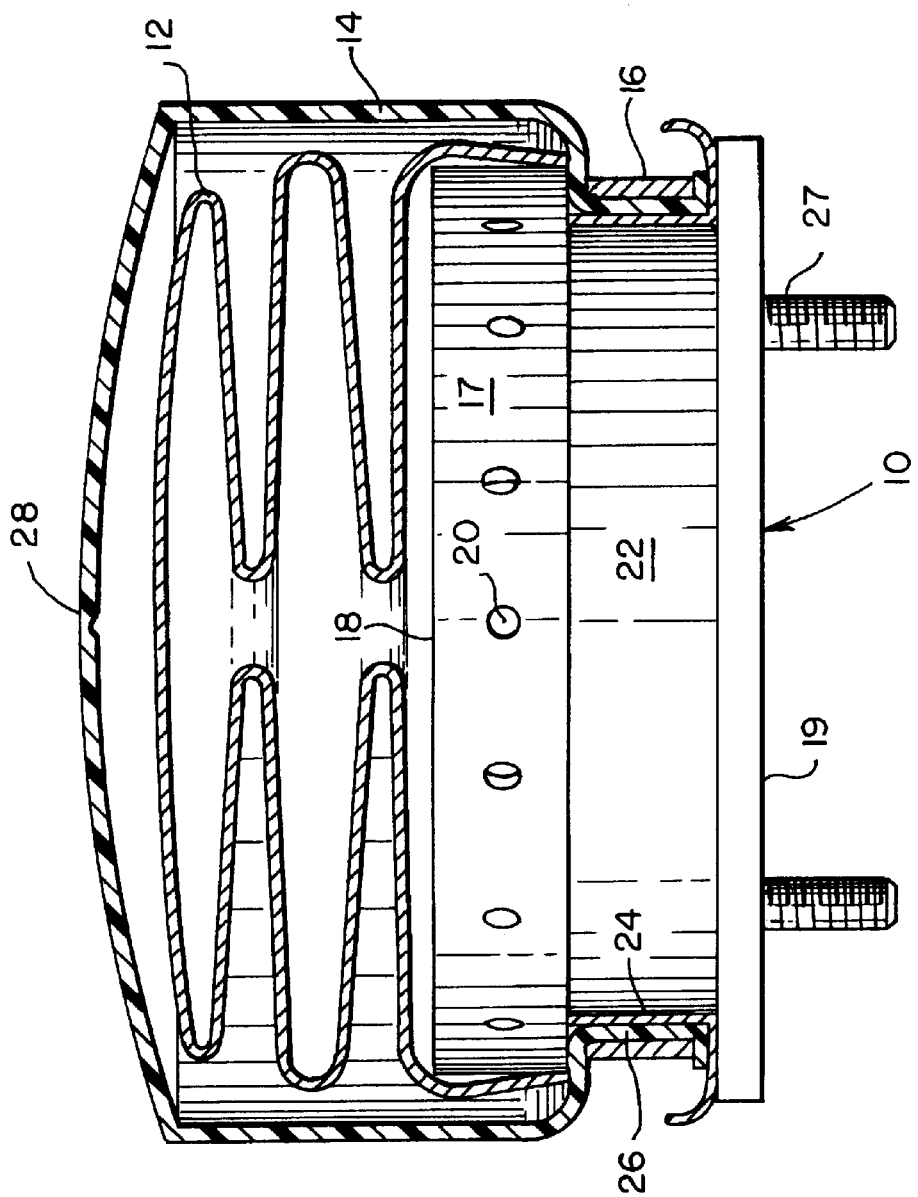
FIG. 1 is a side view, partially in section, of one embodiment of the present invention.

FIG. 1 illustrates a partially cut away airbag system comprising an inflator 10, a folded airbag cushion 12, a cover 14 and a clamp 16. The inflator 10 comprises a generally cylindrical side wall 17 extending between two end walls 18 and 19. Adjacent the first end wall 18 are a series of exhaust ports 20, arranged around the circumference of the side wall 17, and through which the generated inflation gases can exit. Adjacent the second end wall 19 of the inflator is a clamping surface 22 which also extends around the circumference of the inflator and provides a relatively continuous and uniform surface against which the clamp 16 compresses mating portions of the cushion 12 and the cover 14. In this and other preferred embodiments of the invention, the shape and location of the clamping surface assists in guiding and locating the clamp 16, the cushion 12, and formed portions of the cover 14 into the proper position for forming the intended attachment. Mounting pins, such as studs 27, for mounting the assembly to the compartment or vehicle, extend from the second end wall 19. The assembly illustrated is particularly suitable for use as a driver side airbag mounted on the steering column of an automobile.

The inflator 10 contains a gas releasing material, which, upon activation, rapidly releases a sufficient quantity of gas to inflate the cushion 12. This material typically comprises a compressed gas and/or a combustible material, such as a solid pyrotechnic or a fluid fuel with an oxidizing agent, or an exothermically decomposable material. The inflator may also include components which filter and/or cool the generated gas prior to its release through the exhaust ports 20. The exhaust ports are evenly spaced around the circumference of the side wall in order to equalize and cancel the reaction thrust produced by the gases escaping from each of the ports, resulting in the activated inflator developing a neutral reaction thrust.

The folded airbag cushion 12 is made of a sheet of a fabric or film material and includes a collar portion 24 which extends to an opening which is capable of extending over the inflator 10. The cushion is designed so that its inflation causes it to expand to a position between the occupant to be protected and hard surfaces in the compartment into which the occupant's inertia might otherwise cause him to be propelled. The cushion may include internal tethers which assist in directing it to its intended position.

The cover 14 is made of a formed material, such as a molded plastic, and is capable of extending over and protecting the exposed exterior of the folded airbag cushion 12. The cover 14 includes a neck portion 26 which has a shape complimentary to the clamping surface 22 of the inflator 10. The cover also includes areas of reduced strength 28 which define parting lines along which the cover breaks open upon activation of the inflator, allowing the inflating cushion to expand. The area of reduced strength can be provided as an area of reduced thickness produced during the molding process or by scribe lines scored partially through the cover's thickness subsequent to the molding process. The cover is sufficiently rigid to provide protection to he folded cushion. It may also be sufficiently elastic to recover from whatever deformation might be required to install the neck portion over wider portions of the inflator during the assembly process. Alternatively, the neck portion could include longitudinal slits allowing it to fold open as it is installed over wider portions of the inflator during assembly. In a further alternative construction the clamping surface of the inflator could be designed to be the widest portion of the inflator.

The clamp 16 comprises a band, or ribbon, formed from a metal, polymer or composite material, which extends around the inflator 10, the cushion's collar portion 24, and the cover's neck portion 26, at the clamping surface 22. By providing the band in tension, a compressing force against the clamping surface is produced, firmly mounting and holding the cushion, cover and inflator together.

The airbag assembly requires a single fastener, the clamp 16, to position and hold the major components together. Moreover, it does not require the careful orientation of fastener mounting holes, which is involved in the assembly of those airbag assemblies which rely on bolts, screws or rivets mounted through aligned holes, to fasten the components together. The assembly also does not require a connecting structure such as a reaction module, housing or mounting bracket to position and hold the components. Accordingly, the inventive airbag assembly requires fewer parts and fewer manipulative operations during its assembly. These features enable substantial savings in the production costs for each unit, while elimination of the connecting structure permits a reduction in the weight of the assembly.

Figure 2:
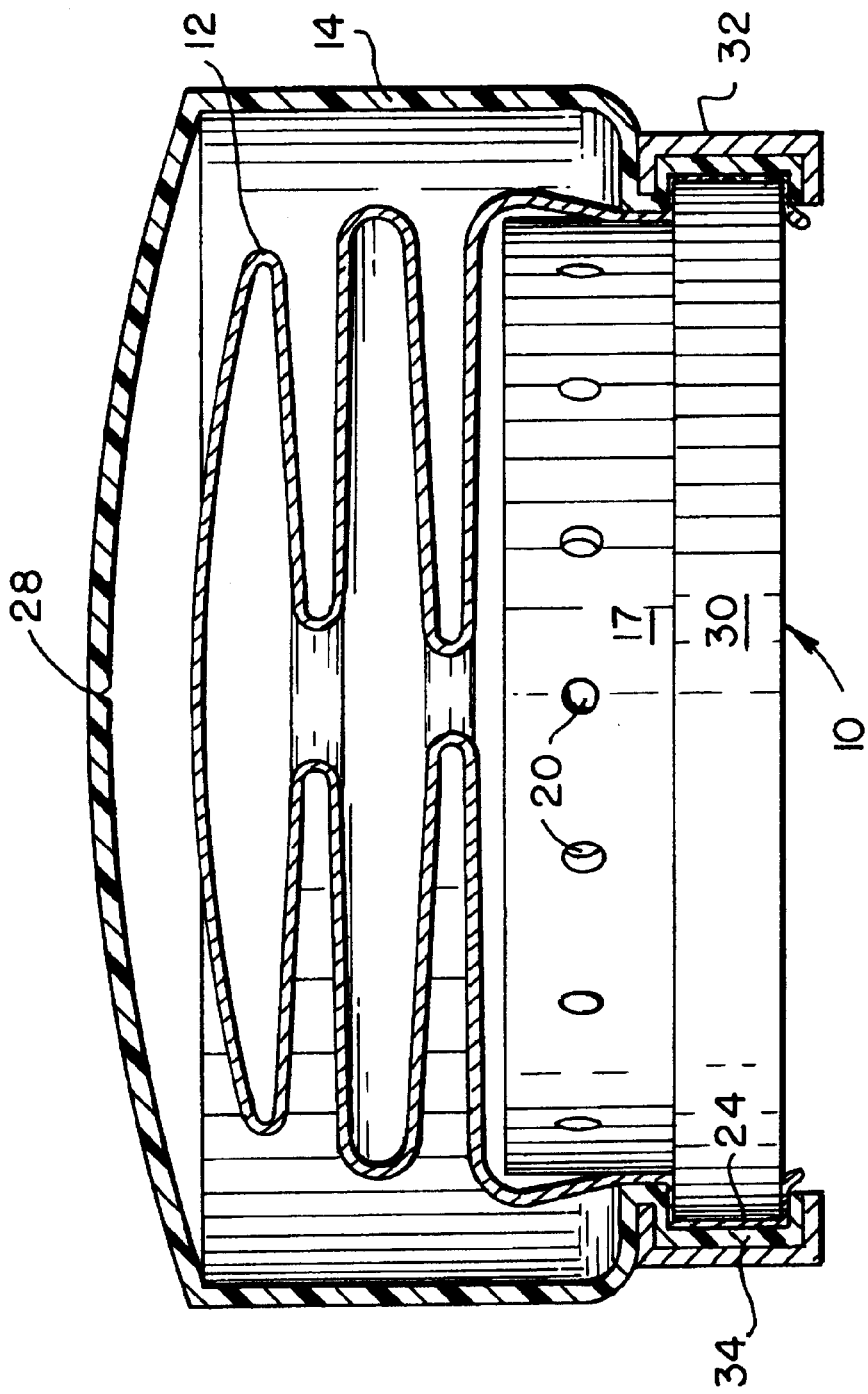
FIG. 2 is a similar side view of a further embodiment of the present invention.

The embodiment shown in FIG. 2 is similar to that of FIG. 1 and uses the same item numbers to refer to the same components. The principal difference over the previous embodiment is the shape of the clamping surface 30 and the corresponding shape of the band of the clamp 32 and the shape of the neck portion 34 of the cover 14. The clamping surface 30 extends about the inflator on a raised portion, or ridge, of its cylindrical side wall 17. The neck portion 34 of the cover 14 includes an inwardly facing C-shaped portion which is fit around the raised portion of the inflator's side wall and the clamping surface 30 thereon. The clamp's band has a C-shaped cross-section sized to fit about the C-shaped portion of the cover 14.

Figure 3:
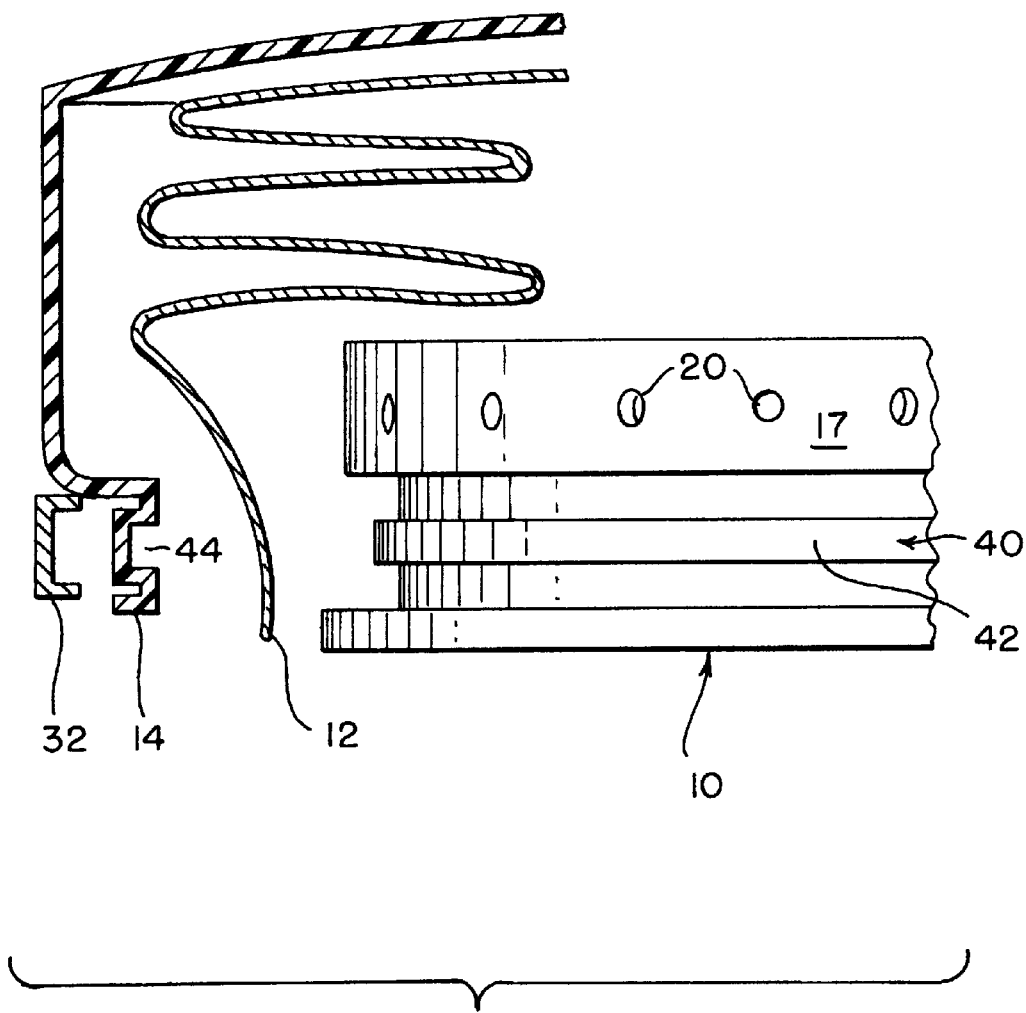
FIG. 3 is an exploded side view, partially in section, of another embodiment of the invention.

The embodiment shown in FIG. 3 uses the same item numbers to refer to components similar to those shown in the preceding embodiments. This embodiment uses a clamping surface 40 which incorporates a rib 42 extending outwardly from the adjacent portions of the clamping surface in order to enhance the holding strength of the clamping arrangement. A single rib or multiple ribs can be provided. As illustrated, the throat portion 44 of the cover has a shape designed to conform to the clamping surface 40 with its rib 42. Dependent upon the height the rib 42 extends above the adjacent portions of the clamping surface, and the deformability of the material used to form the cover 14, the cover 14 can be provided with a throat portion 44 shaped as shown or it may rely on the compression applied during assembly of the clamp to deform the throat portion into a shape conforming to the ribbed clamping surface.

Figure 4:
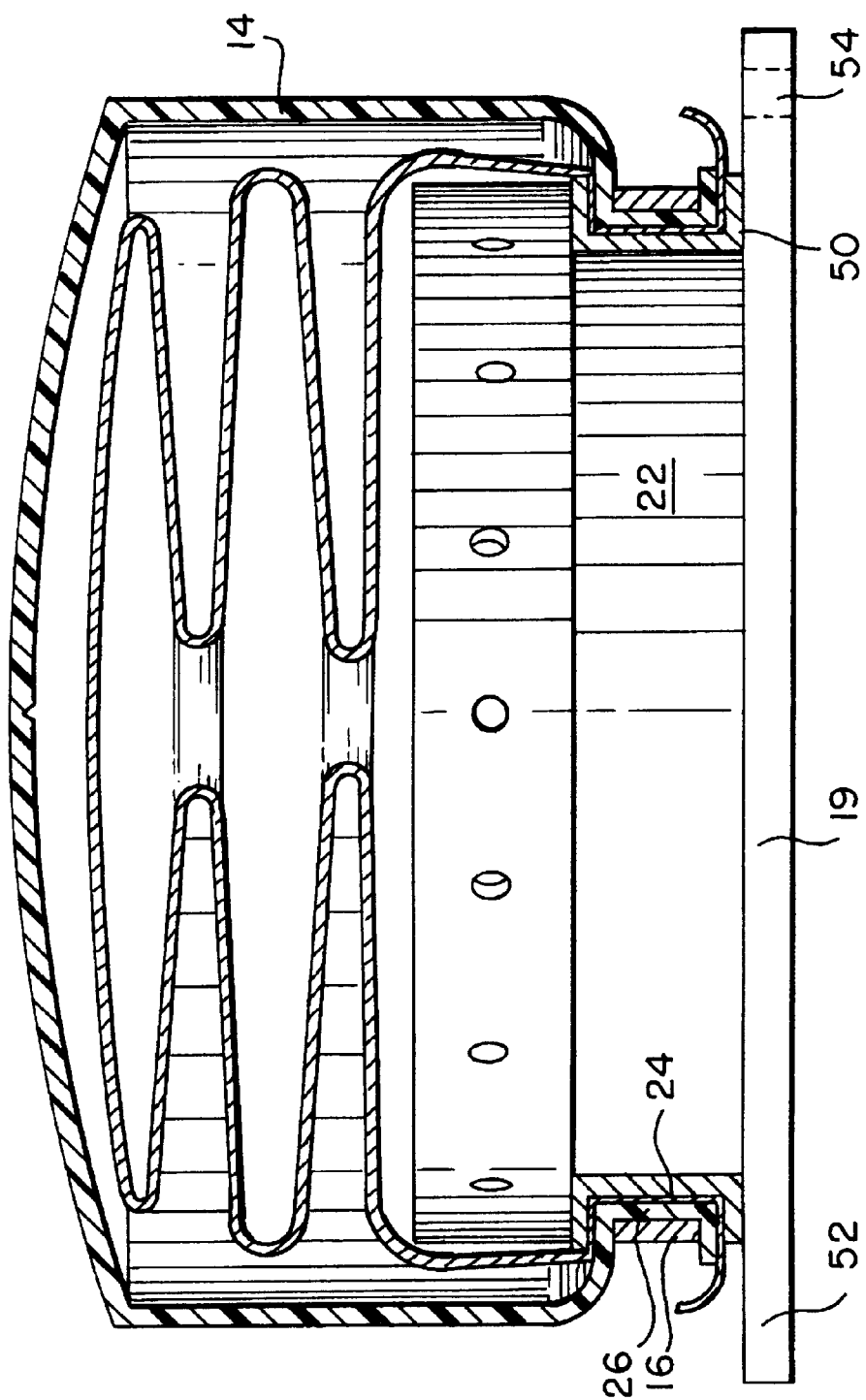
FIG. 4 is a side view, partially in section, of a further embodiment of the invention.

FIG. 4 illustrates an embodiment which additionally incorporates an insulating structure in the assembly. Some of the materials used to form airbag cushions may be damaged by the temperatures produced by certain of the exothermic materials used to generate gases in inflators. In this embodiment, an insulating structure 50 located between the cushion fabric and the clamping surface 22 serves to limit the maximum temperature to which the fabric is exposed. The C-shaped structure 50 is made from an insulating material, such as a matted fiberglass or a foamed polymer. The neck portion 26 of the cover 14 is located over the collar 24 and the band of the clamp 16 is located over the neck portion 26. The insulating structure 50 and/or the neck portion of the cover can include small grip-enhancing protrusions from their surfaces facing the cushion collar 24. The second end wall 19 can extend past the side wall 17 a sufficient distance to form a flange having mounting ports for attaching the assembly to a suitable mounting surface.

Figure 5:
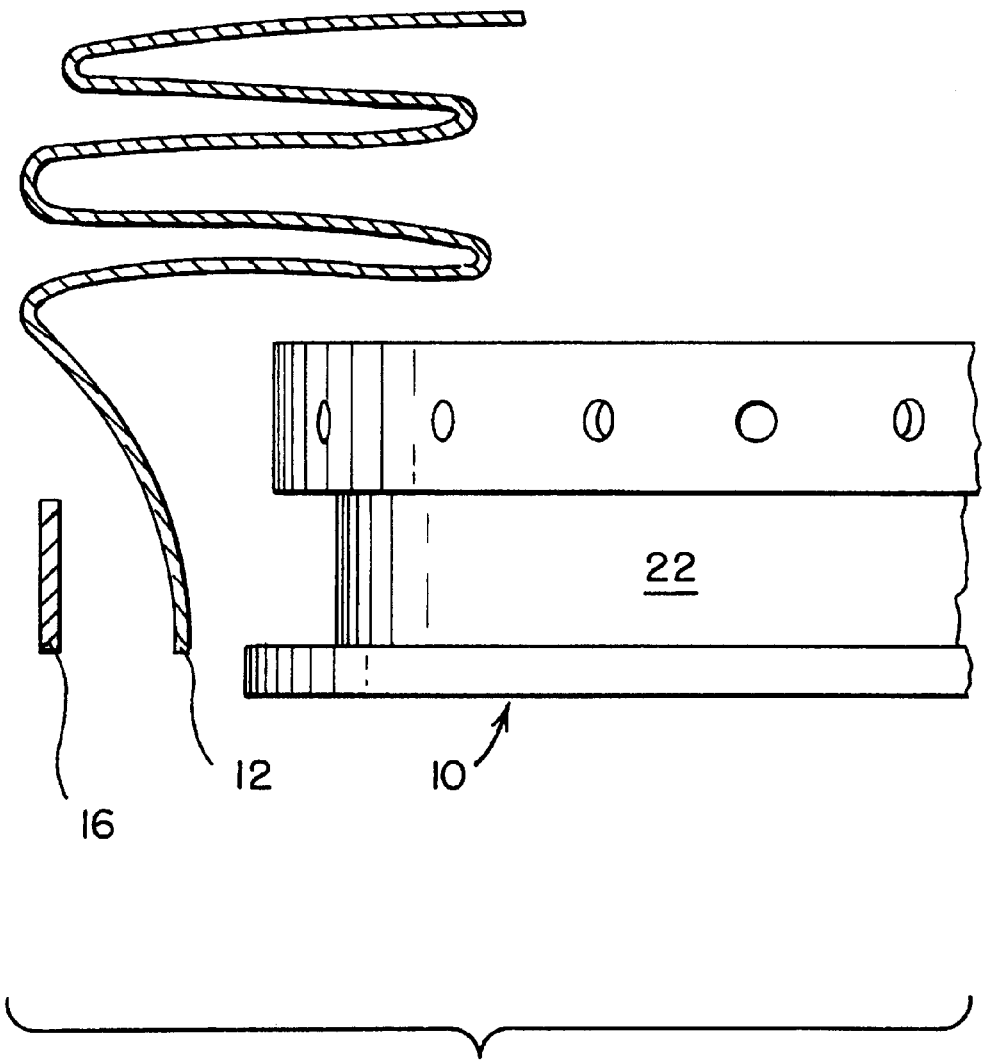
FIG. 5 is an exploded side view of yet another embodiment of the invention.

The embodiment illustrated in FIG. 5 is similar to that of FIG. 1, differing therefrom in omitting the cover from the components held in place between the clamp 16 and the clamping surface 22. This embodiment illustrates an effective and inexpensive method of attaching the cushion 12 directly to the inflator 10 with a single fastener. The embodiment is particularly useful where the assembly does not require an integral cover, such as where it is to be mounted behind a panel, such as an instrument panel, having an openable portion provided directly within the panel itself, through which the cushion can be deployed.

The clamp 16 used in the preceding embodiments can be selected from numerous forms of hose clamps presently available. These clamps typically include a metal or plastic band, or strap, which has a tensioning and/or gripping mechanism fixed at one end thereof with the free other end of the strap extending through and gripped by the mechanism. Once the cushion, the cover, and the optional insulation structure are arranged above the clamping surface, the clamp is arranged around the throat of the cover and the strap is tensioned by advancing its free other end further through the gripping mechanism until it encounters resistance caused by compression of the other components against the clamping surface.

Alternatively, the clamp can comprise a generally circular band or strap having a shortenable segment which is adapted to be permanently deformed by an externally applied tool, such as by pinching such segment with pliers to result in a circular band or strap of smaller diameter than the original circular band. When such a clamp is used, it is arranged around the other components and a tool used to permanently deform the shortenable segment sufficiently that the collar of the cushion is compressed.

A further suitable clamp can comprise a circular band or strap of a heat shrinkable material, such as certain oriented plastics. Such a clamp is arranged around the other components and then heat is applied to the clamp causing the circular band to shrink and compress the other components against the clamping surface.

Clamps which use bands or straps which are other than flat, such as the C-shaped band shown in the embodiment of FIG. 2, may require that the band be essentially flat at locations along its length in order that it be formed into the generally circular shape required by the clamp. Such can be provided in the clamp 32 of the FIG. 2 embodiment by providing V-shaped notches in the depending legs on both edges of the band, periodically along the length of the band.

The portion of the collar of the cushion which is compressed between the clamp and the clamping surface should be flat and sufficiently flexible to conform to the space provided between the cover and the clamping surface. Accordingly, such features as stiffening or gripping inserts, as are often provided around the opening into the airbag cushion, are not used in our cushion. However, reinforcement of the portion of the cushion where it is attached to the inflator to avoid failure due to the concentrated forces applied in that area during inflation is desirable. Suitable reinforcement is provided by a multiple layer, preferably a double or triple layer, of the material used to form the cushion. The multiple layers can be provided by folding the cushion fabric back over itself in the portion of the collar adjacent the opening, and stitching, or otherwise fastening, it in position. Such a multiple layer presents a generally flat cross-section which is sufficiently flexible to conform to the space provided between the clamp 26 and clamping surface 22 for forming the attachment.

It should be understood that the foregoing description is provided to advise workers how to make and practice the invention and is not intended to limit the scope of the covered invention. Many modifications to the described embodiments within the scope of the invention should be apparent to workers in the art. The scope of the invention is defined by the following claims.

We claim:

1. An inflatable passive restraint system, comprising:

an inflatable cushion having a collar formed from a sheet material extending to an opening, an inflator capable of providing sufficient inflation gas to inflate said inflatable cushion and having exit ports through which said inflation gas is discharged, and a clamp comprising a band capable of extending substantially about said inflator, wherein:

said inflator includes a clamping surface extending about its exterior which is capable of cooperating with said clamp to form an essentially fluid tight connection between said cushion and said inflator when said sheet material is compressed between said clamp and said clamping surface, a portion of said cushion, including at least a portion of said collar, extends over said exit ports and said clamping surface, and said band extends around and compresses said collar against said clamping surface forming an essentially fluid tight connection between said cushion and said inflator.

2. The inflatable passive restraint system of claim 1, wherein said clamp includes means for maintaining the portion of said band which extends about said inflator under tension.

3. The inflatable passive restraint system of claim 1, wherein at least a portion of said collar which is compressed between said clamp and said clamping surface includes at least two layers of said sheet material.

4. The inflatable passive restraint system of claim 1, wherein said clamping surface is located in a groove which extends about at least a portion of the exterior of said inflator.

5. The inflatable passive restraint system of claim 4 wherein said band has a cross-section which is capable of fitting within said groove.

6. The inflatable passive restraint system of claim 4, wherein said groove extends fully around the exterior of said inflator.

7. The inflatable passive restraint system of claim 1 wherein said clamping surface is located on a raised ridge which extends about at least a portion of the exterior of said inflator.

8. The inflatable passive restraint system of claim 7 wherein said band has a generally C-shaped cross-section which is capable of fitting over said raised ridge.

9. The inflatable passive restraint system of claim 7 wherein said raised ridge extends fully around the exterior of said inflator.

10. The inflatable passive restraint system of claim 1 wherein said band has a generally rectangular cross-section.

11. The inflatable passive restraint system of claim 1 wherein said band is formed from metal, polymer or composite material.

12. The inflatable passive restraint system of claim 1 wherein said clamping surface includes at least one protruding rib extending about the exterior of said inflator.

13. The inflatable passive restraint system of claim 12 wherein at least two of said protruding ribs are provided as part of said clamping surface.

14. The inflatable passive restraint system of claim 1 wherein at least one layer of a heat insulating material separates said cushion from said clamping surface.

15. The inflatable passive restraint system of claim 1, further comprising:

a cover extending about said cushion and having a neck portion which extends over said collar and said clamping surface, whereby:

said clamp extends about both said throat and said collar.

16. The inflatable passive restraint system of claim 15, wherein at least one layer of a heat insulating material separates said cushion from said clamping surface.

17. The inflatable passive restraint system of claim 15 wherein:

said cover substantially surrounds said cushion, and said cover includes areas of reduced strength that separate upon activation of the system providing an opening through which at least a portion of the cushion passes as it inflates.

\* \* \* \* \*